United States Patent
Nakagawa et al.

(10) Patent No.: US 9,389,366 B2
(45) Date of Patent: Jul. 12, 2016

(54) OPTICAL MODULES FOR WAVELENGTH MULTIPLEXING

(71) Applicant: International Business Machines Corporation, Armonk, NY (US)

(72) Inventors: Shigeru Nakagawa, Tokyo (JP); Yoichi Taira, Tokyo (JP); Masao Tokunari, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 14/519,494

(22) Filed: Oct. 21, 2014

(65) Prior Publication Data
US 2015/0153522 A1 Jun. 4, 2015

(30) Foreign Application Priority Data
Nov. 29, 2013 (JP) ................................ 2013-247348

(51) Int. Cl.
*G02B 6/42* (2006.01)
*G02B 6/293* (2006.01)

(52) U.S. Cl.
CPC .......... *G02B 6/2938* (2013.01); *G02B 6/29362* (2013.01); *G02B 6/29368* (2013.01); *G02B 6/4215* (2013.01); *G02B 6/4246* (2013.01)

(58) Field of Classification Search
None
See application file for complete search history.

(56) References Cited

U.S. PATENT DOCUMENTS

| 5,521,733 | A | * | 5/1996 | Akiyama et al. | ... | G02B 6/29362 398/48 |
| 5,864,642 | A | * | 1/1999 | Chun et al. | ........... | H05K 1/0274 385/14 |
| 6,219,470 | B1 | * | 4/2001 | Tu | ........................ | G02B 6/4204 385/14 |

(Continued)

FOREIGN PATENT DOCUMENTS

| JP | 05235903 | | 10/1993 |
| JP | 200144582 | A | 2/2001 |
| JP | 2002374039 | A | 12/2002 |

(Continued)

OTHER PUBLICATIONS

Lemoff et al., "500-Gbps Parallel-WDM Optical Interconnect", 2005 Electronic Components and Technology Conference, pp. 1027-1031, © 2005 IEEE.

(Continued)

*Primary Examiner* — Mike Stahl
(74) *Attorney, Agent, or Firm* — Noah A. Sharkan (57) ABSTRACT

Embodiments of the present invention provide optical modules which input and output wavelength multiplexed optical signals to and from an optical waveguide, and a manufacturing method thereof. In one embodiment, an optical module comprises light emitting and light receiving element pairs that are positioned on grooves of one or more optical waveguides, where each light emitting and light receiving element pair corresponds to a different wavelength of light. Each light emitting and light receiving element pair includes an optical pin comprising an inclined surface and a light selecting filter that are configured to reflect light of a corresponding wavelength from an optical waveguide to the light receiving element, and from the light emitting element to the optical waveguide.

12 Claims, 10 Drawing Sheets

(56) References Cited

U.S. PATENT DOCUMENTS

| | | | | |
|---|---|---|---|---|
| 7,239,767 B2 * | 7/2007 | Kim et al. | ................ | G02B 6/42 385/14 |
| 7,603,005 B2 * | 10/2009 | Shioda | ............... | G02B 6/12 385/14 |
| 2003/0190124 A1 * | 10/2003 | Kuhara | ................ | G02B 6/42 385/88 |
| 2004/0096152 A1 * | 5/2004 | Nakama et al. | .... | G02B 6/12 385/31 |
| 2011/0069464 A1 * | 3/2011 | Joe et al. | ............... | G02B 6/42 361/783 |
| 2015/0104129 A1 * | 4/2015 | Nakagawa et al. | ...... | G02B 6/43 385/14 |

FOREIGN PATENT DOCUMENTS

| | | |
|---|---|---|
| JP | 2008218548 A | 9/2008 |
| JP | 2009003272 A | 1/2009 |
| JP | 2011187730 A | 9/2011 |
| JP | 2011216557 A | 10/2011 |
| JP | 2011257476 A | 12/2011 |
| WO | WO 2010/036081 A2 * 4/2010 | ............... G02B 6/42 |
| WO | WO 2011/117807 A1 * 9/2011 | ........... G02B 6/4215 |

OTHER PUBLICATIONS

Murata et al., "Coupling of Optical Pin to Optical Waveguide for Optical Surface Mount Technology", Journal of the Japan Institute of Electronics Packaging, vol. 8 No. 1 (2005), pp. 52-58.

"Optical Module and Optical Module Manufacturing Method", Japanese Patent Application No. 2013-247348, Filed on Nov. 29, 2013 (English Translation).

* cited by examiner

FIG. 1

PRIOR ART

| LASER WAVELENGTH | 940nm | 980nm | 1020nm | 1060nm |
|---|---|---|---|---|
| TOTAL LOSS (dB) | 1.0 | 0.9 | 0.9 | 0.6 |
| FIRST FILTER (dB) | 0.6 (reflection) | - | - | - |
| SECOND FILTER (dB) | 0.3 (transmission) | 0.4 (reflection) | - | - |
| THIRD FILTER (dB) | 0.1 (transmission) | 0.3 (transmission) | 0.4 (reflection) | - |
| FOURTH FILTER (dB) | 0.0 (transmission) | 0.2 (transmission) | 0.5 (transmission) | 0.6 (reflection) |

| LASER WAVELENGTH | 940nm | 980nm | 1020nm | 1060nm |
|---|---|---|---|---|
| TOTAL LOSS (dB) | 1.0 | 0.8 | 0.8 | 0.3 |
| FIRST FILTER (dB) | 0.3 (reflection) | - | - | - |
| SECOND FILTER (dB) | 0.6 (transmission) | 0.2 (reflection) | - | - |
| THIRD FILTER (dB) | 0.1 (transmission) | 0.3 (transmission) | 0.2 (reflection) | - |
| FOURTH FILTER (dB) | 0.0 (transmission) | 0.3 (transmission) | 0.6 (transmission) | 0.3 (reflection) |

FIG. 10B

OPTICAL MODULES FOR WAVELENGTH MULTIPLEXING

CROSS-REFERENCE TO RELATED PATENT APPLICATION(S)

Pursuant to 35 U.S.C. §119, the present application claims priority to Japanese Patent Application No. 2013-247348, filed Nov. 29, 2013, the entire contents of which are incorporated herein by reference.

FIELD OF THE INVENTION

The present invention relates to an optical communication technology, and particularly relates to an optical module which inputs and outputs wavelength multiplexed optical signals to/from an optical waveguide and a manufacturing method thereof.

BACKGROUND

The In the optical communication technology, particularly in a conventional optical MCM (Multi-Chip Module), a spatial multiplexing system which increases the number of channels is adopted in order to increase a signal band, and an array of light emitting elements for optical transmission such as a VCSEL (Vertical Cavity Surface Emitting Laser) of 12 channels and a 250 µm pitch and light receiving elements for optical reception, such as a PD (Photo Diode), is often used. While a VCSEL/PD chip is mounted on an optical waveguide of 12 channels, density is assumed to be increased to 24 channels and a 125 µm pitch, and 48 channels and a 62.5 µm pitch to widen a band further.

It is assumed that the optical waveguide is connected to an optical fiber. Therefore, when considering that a clad diameter of the optical fiber used in a present state is 125 µm, density increase has a limit of the 125 µm pitch. Even if the limit of 125 µm pitch is exceeded by reducing a diameter of the optical fiber, when a core width of a general multimode optical fiber being 35 µm and leakage of light are taken into consideration, the density increase of 48 channels or more is limited when the optical waveguide is one layer. Also, when the optical waveguide is turned to two or more layers, connection loss due to spread of a light beam becomes a serious problem.

Figure 1:
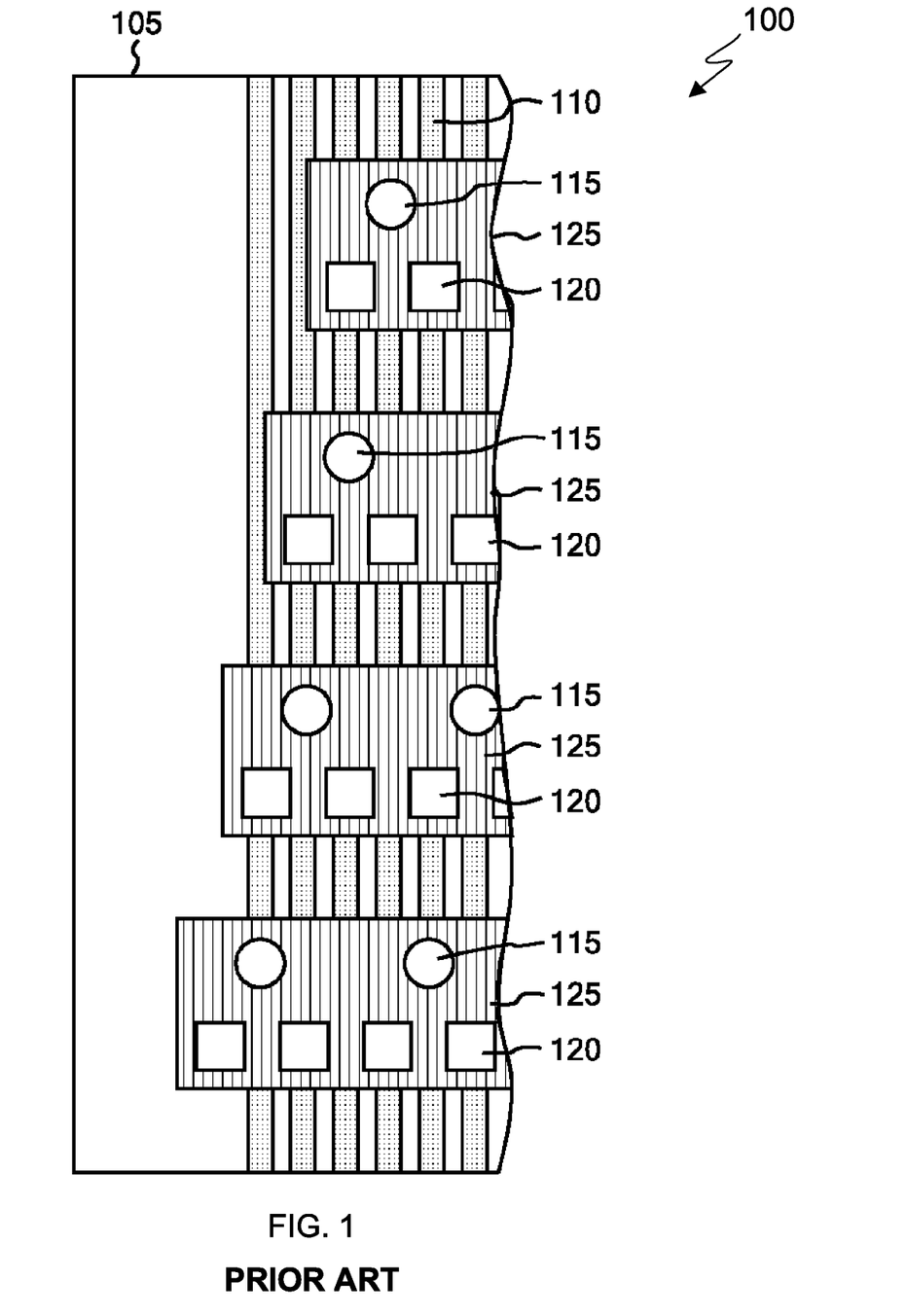
FIG. 1 is a top plan view schematically illustrating a structure of a prior art optical module whose density is increased by a conventional spatial multiplexing system.

FIG. 1 illustrates a schematic top plan view of a prior art optical module 100, whose density is increased by the conventional spatial multiplexing system. On a surface of a substrate 105, a plurality of optical waveguides 110 are disposed in high density. On one end of each optical waveguide 110, one light input/output part 115 which can be implemented by reflection means, like a mirror that is inclined at 45 degrees to reflect and change light from a horizontal direction to a vertical direction for instance, is provided separately without being arranged side-by-side; each light input/output part 115 includes two each of electric pads 120 for input and output, and a VCSEL/PD chip 125 is configured. When the optical waveguides 110 are arrayed with a 35 µm width and at a 62.5 µm pitch, a space between the optical waveguides 110 is 27.5 µm. Considering the leakage of the light, it is difficult to implement electric wiring from the electric pads 120 so as not to exert an influence on the array of the optical waveguides 110.

One known technology involves a 500-Gbps parallel wavelength division multiplexing (PWDM: Parallel Wavelength Division Multiplexing) optical interconnect for executing 48-channel data transmission of 10.42 Gbps by 12 optical fiber ribbons in parallel having four wavelengths per optical fiber. While rough wavelength multiplexing is used to connect the VCSEL, the PD, and the optical fiber in order to increase the density, propagation of light is controlled only by reflection in the optical interconnect; there is no structure which controls the propagation of the light by a waveguide, and insertion loss (loss from light reception or emission to the optical fibers coupling) is as large as 6-8 dB in each of a transmitter and a receiver.

Another known technology involves applying an optical pin having a mirror surface inclined at 45 degrees to carry out 90-degree optical path conversion at a distal end to an optical waveguide and optically coupling a VCSEL or a PD disposed on the optical waveguide and the optical waveguide. In the optical communication technology, since one VCSEL or PD is provided in correspondence in one optical waveguide, and only one optical signal corresponding to the VCSEL or PD is transmitted and received in one optical waveguide, this optical communication technology is not different from the conventional spatial multiplexing system.

Another known technology involves providing an optical path conversion mirror inclined at 45 degrees in an optical waveguide inside a substrate and optically coupling a light emitting element or a light receiving element disposed on the substrate and the optical waveguide. Also in this optical communication technology, since one light emitting element or light receiving element is provided in correspondence in one optical waveguide, and only one optical signal corresponding to the light emitting element or the light receiving element is transmitted and received in one optical waveguide, this optical communication technology is not different from the conventional spatial multiplexing system either.

Another known technology involves an optical receiver wherein a first substrate that is formed of a light transmissive material and has a plurality of light receiving elements formed on a front surface and a plurality of V grooves formed on a back surface, and a second substrate that is formed of a light transmissive material of the same refractive index as the first substrate and has a plurality of projections in a shape to be fitted with the V grooves formed on a front surface, are integrally molded by being joined by fitting the V grooves and the projections respectively. Wavelength multiplexed light that passes through crossing the fitted V grooves and projections pass through without being reflected on a non-reflection film formed on one slant face of each V groove, and only the light of a corresponding wavelength is reflected at a band rejection filter formed on the other slant face of each V groove, passes through the first substrate and enters the light receiving element. While the light is propagated through the first substrate and the second substrate, the light is reflected as it is since one interface of each V groove is a 45-degree slant face, so that it is needed to form the non-reflection film on the slant face in order to propagate the light. Also, since there is no structure of confining the propagation of the light by a waveguide, insertion loss becomes large.

SUMMARY

In one embodiment of the present invention, an optical module is provided comprising: at least one optical waveguide provided on a surface of a substrate; a plurality of grooves provided on the at least one optical waveguide on the surface of the substrate; a plurality of light emitting and light receiving element pairs positioned on the plurality of grooves of the at least one optical waveguide, wherein each light emitting and light receiving element pair respectively corresponds to a different wavelength of light of a plurality of wavelengths of light; a plurality of optical pins provided in each of the plurality of light emitting and light receiving element pairs and disposed in the plurality of grooves of the at least one optical waveguide, each of the plurality of optical pins being configured to allow light exiting from a light emitting element and light entering a light receiving element to pass through, each of the plurality of optical pins being provided with an inclined surface on an upper end on a side opposite to a lower end, wherein the inclined surface is inclined to turn, when light from an optical waveguide is reflected on the inclined surface, the reflected light to a light receiving element, and to turn, when light from a light emitting element is reflected, the reflected light to an optical waveguide; and a light selecting filter provided on each of the inclined surfaces of the plurality of optical pins, wherein each light selecting filter is configured to reflect light of a corresponding wavelength exiting from the light emitting element of the corresponding light emitting and light receiving element pair, select light of the corresponding wavelength from propagation light propagated through the at least one optical waveguide, and reflect light to the light receiving element of the corresponding light emitting and light receiving element pair, respectively.

In a further embodiment, the different wavelengths of light of the plurality of wavelengths of light differ by at least 10 nm.

In a further embodiment, each of the inclined surfaces of the plurality of optical pins is a surface inclined at 45 degrees to the surface of the substrate.

In a further embodiment, the plurality of optical pins are formed of a light transmissive resin.

In a further embodiment, each of the light selecting filters is a DBR (Distributed Bragg Reflector) filter.

In a further embodiment, light transmissive underfill is filled in the plurality of grooves of the at least one optical waveguide.

In another embodiment of the present invention, a method for manufacturing an optical module is provided comprising: producing a replica resin die from an original mold, wherein patterns of a plurality of optical pins each having an inclined surface on an upper end are formed; positioning the replica resin die on a wafer provided with a plurality of light emitting and light receiving element pairs respectively corresponding to a different wavelength of light of a plurality of wavelengths of light; forming the plurality of optical pins on the wafer by applying a release agent to the replica resin die, putting a curable light transmissive resin into the replica resin die, and detaching the replica resin die after curing the curable light transmissive resin; forming a plurality of light selecting filters for reflecting light of respectively corresponding wavelengths on the inclined surfaces of the plurality of optical pins formed on the wafer; dicing the wafer to cut out a plurality of chips, each chip having an optical pin where a light selecting filter is formed and a light emitting and light receiving element pair; forming a plurality of grooves on at least one optical waveguide provided on a surface of a substrate; and disposing the plurality of optical pins where the respectively corresponding light selecting filters are formed in the plurality of grooves formed on the at least one optical waveguide.

In a further embodiment, each of the inclined surfaces of the plurality of optical pins is a surface inclined at 45 degrees to the surface of the substrate.

In a further embodiment, the curable light transmissive resin is a photocurable acrylic resin.

In a further embodiment, forming the plurality of light selecting filters for reflecting light of respectively corresponding wavelengths on the inclined surfaces of the plurality of optical pins formed on the wafer comprises: forming a mask for exposing the inclined surfaces of the plurality of optical pins where the plurality of optical pins are formed on the wafer; and vapor-depositing a DBR (Distributed Bragg Reflector) filter onto the exposed inclined surfaces of the plurality of optical pins.

In a further embodiment, forming a mask for exposing the inclined surfaces of the plurality of optical pins where the plurality of optical pins are formed on the wafer comprises: attaching resist onto the wafer where the plurality of optical pins are formed; exposing and developing the resist using the mask; and exposing the inclined surfaces of the plurality of optical pins from the resist.

In a further embodiment, the method further comprises providing, on the surface of the substrate, the plurality of chips.

DETAILED DESCRIPTION

Embodiments of the present invention provide an optical communication technology that is capable of increasing channel density by increasing the number of channels and exceeding a limit of channel density that can be attained by a spatial multiplexing system. In one embodiment, an optical module which inputs and outputs wavelength multiplexed optical signals to/from an optical waveguide and a manufacturing method thereof are provided, where bands of optical signals can be increased by the number of wavelengths in each optical waveguide, without increasing the number of the optical waveguides, by density increase by a narrow pitch in a horizontal direction and density increase by multiple layers in a vertical direction.

Hereinafter, a best mode for carrying out the present invention will be described in detail with reference to drawings; however, the following embodiment does not limit the invention according to the scope of claims, and all combinations of features described in the embodiment are not necessarily essential to a solution of the invention. The present invention can be carried out in many different forms and should not be interpreted as being limited to contents of the described embodiment. Also, the same numbers are attached to the same components and elements throughout the entire description of the embodiment.

Figure 2:
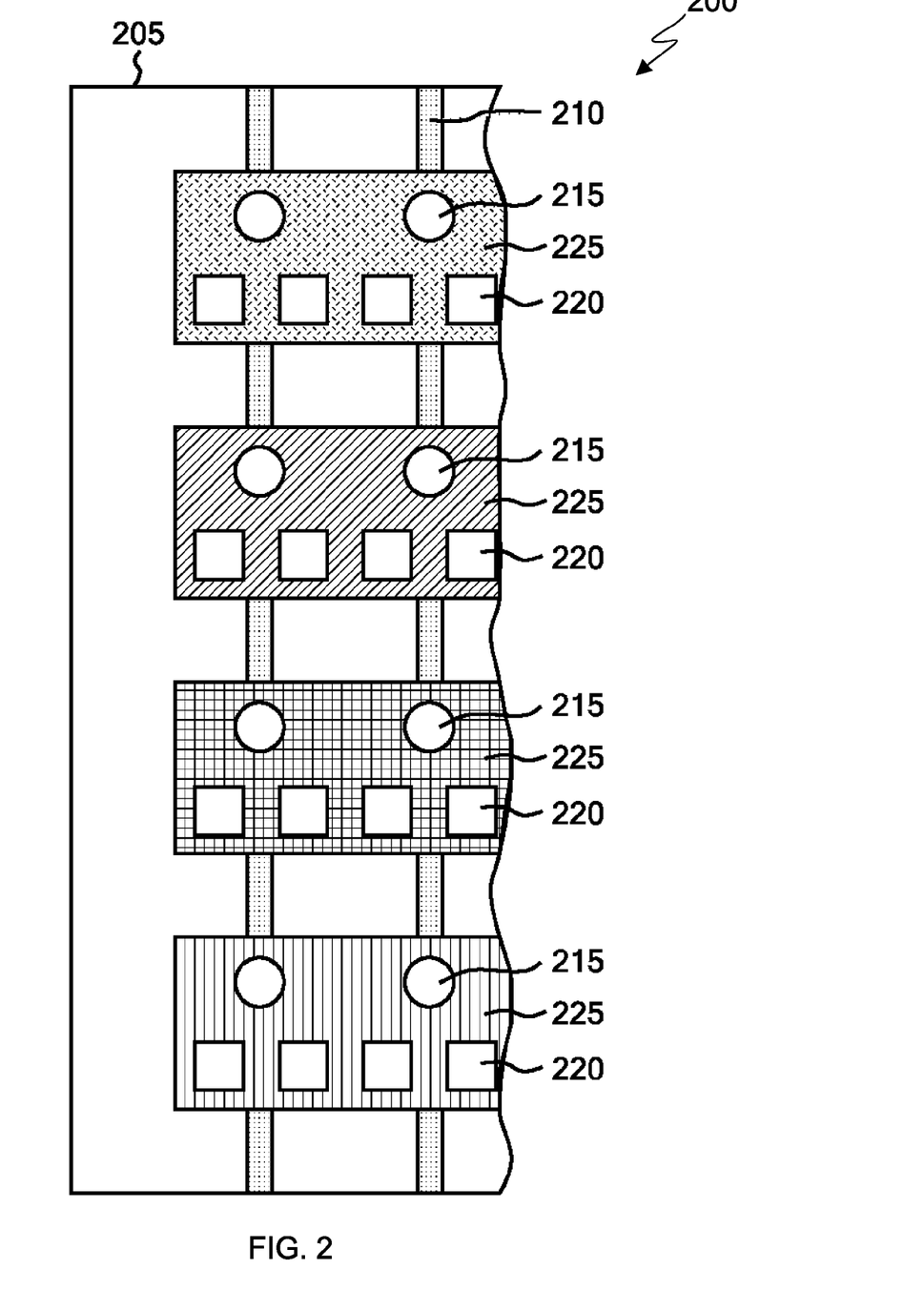
FIG. 2 is a top plan view schematically illustrating a structure of an optical module, according to one embodiment of the present invention.

FIG. 2 illustrates a schematic top plan view of an optical module 200, according to one embodiment of the present invention. In optical module 200, compared to the prior art optical module 100 in FIG. 1, a plurality of optical waveguides 210 are disposed at appropriate intervals on a surface of substrate 205. It is not needed to narrow the interval of the optical waveguides 210 to be the interval of the optical waveguides 110 in the optical module 100 (which transmits optical signals of one wavelength), since the optical signals multiplexed by four wavelengths are transmitted in one optical waveguide 210, as illustrated in FIG. 2 for instance.

Optical module 200 is configured such that the individual optical waveguides 210 are each provided with four VCSEL/PD chips 225, for instance, as the light emitting and light receiving element pairs. The individual VCSEL/PD chips 225 are arranged in parallel crossing the individual optical waveguides 210 since the wavelengths are different, and light input/output parts 215 to the individual optical waveguides 210 are arranged side-by-side. Each light input/output part 215 is, as described later, implemented by an optical pin disposed in a groove that is formed on the optical waveguide 210 and a light selecting filter provided on an inclined surface of the optical pin. If light input/output parts 115 are to be provided separately without being arranged side-by-side (as in the optical module 100 in FIG. 1), the grooves for disposing reflection means in the optical waveguide 110 can be individually formed by laser abrasion or the like; however, in optical module 200, since transmission/reflection of light is controlled by the light selecting filter, the grooves for disposing the optical pin and the light selecting filter provided on the inclined surface of the optical pin can be formed altogether by dicing or the like, for instance. Also, the individual VCSEL/PD chips 225 each include two of electric pads 220 for input and output to the individual light input/output parts 215. The individual electric pads 220 can be provided between the optical waveguides 210 without passing through the optical waveguides 210 and without hindrance.

While in the prior art optical module 100 of FIG. 1, four channels are achieved by providing four optical waveguides 110 in a 250 μm width at a 62.5 μm pitch, which transmits the optical signals of one wavelength, in the optical module 200, which inputs and outputs four-wavelength multiplexed optical signals, four channels are achieved by providing one optical waveguide 210 in the 250 μm width. In optical module 200, not only can the density can be increased by increasing the number of channels exceeding the limit of the channel density that can be attained by the spatial multiplexing system, but also formation of the light input/output parts 215 can be simplified, and arrangement of the VCSEL/PD chips 225 having the electric pads 220 can be facilitated.

Figure 3:
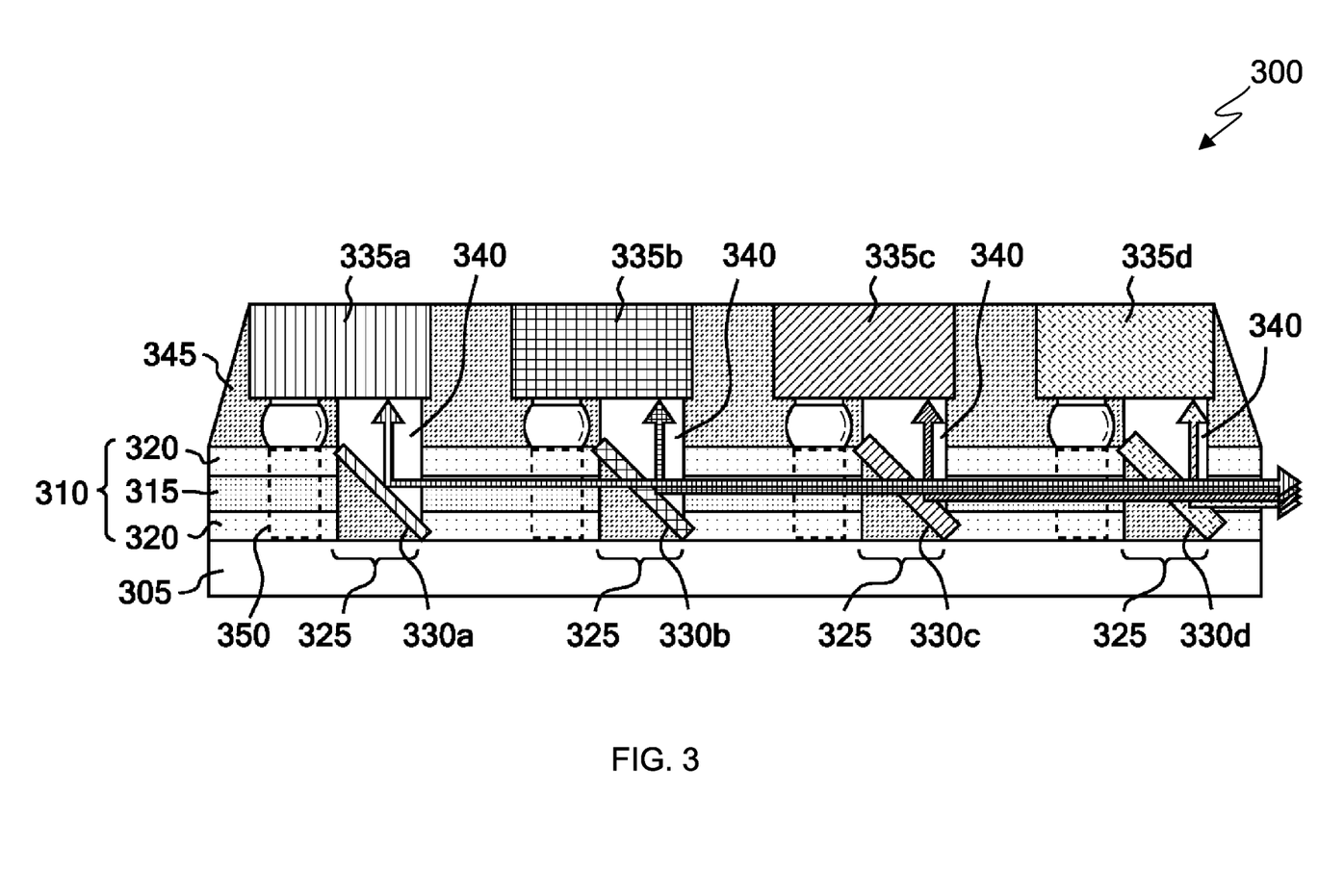
FIG. 3 is a sectional side view schematically illustrating a structure of an optical module, according to one embodiment of the present invention.

FIG. 3 illustrates a schematic sectional side view of an optical module 300, according to one embodiment of the present invention. Also in optical module 300, a plurality of optical waveguides 310 are disposed at appropriate intervals on a surface of a substrate 305. Each optical waveguide 310 is formed of a core 315 of a 35 μm size, for instance, and a clad 320. The individual optical waveguides 310 are provided with a plurality of grooves 325 having a side face vertical to the surface of the substrate 305 corresponding to the number of the wavelengths to be multiplexed of the optical signals. For instance, when multiplexing is to be carried by the wavelengths of 940 nm, 980 nm, 1020 nm and 1060 nm, four grooves 325 are formed on each optical waveguide 310.

On the optical waveguide 310, four light emitting and light receiving element pairs are positioned and provided in the four grooves 325 of the optical waveguide 310, respectively corresponding to the light of the four different wavelengths, for instance VCSEL/PD chips 335a (940 nm), 335b (980 nm), 335c (1020 nm), and 335d (1060 nm). The VCSEL/PD chips 335a (940 nm), 335b (980 nm), 335c (1020 nm), and 335d (1060 nm) that are the four light emitting and light receiving element pairs are each provided, on a light emitting surface and a light receiving surface thereof, with an optical pin 340 for allowing the light exiting from a light emitting element and the light entering a light receiving element to pass through. Each optical pin 340 is formed of a lower end and an upper end on a side opposite to the lower end, where the lower end has a bottom surface in contact with the light emitting surface and light receiving surface of the light emitting and light receiving element pair, and the upper end has an inclined surface. The inclined surface is inclined to turn, when the light from the optical waveguide 310 is reflected on the surface, the reflected light to the light receiving element (light receiving surface), and to turn, when the light from the light emitting element (light emitting surface) is reflected, the reflected light to the optical waveguide 310. The inclined surfaces of the individual optical pins 340 are each provided with DBR filters 330a, 330b, 330c, and 330d, which are four light selecting filters. The four DBR filters 330a-330d reflect the light of the corresponding wavelength exiting from a VCSEL, which is the light emitting element of the corresponding VCSEL/PD chips 335a-335d, and entering and hitting the respective optical pin 340 and make the light enter the optical waveguide 310. The four DBR filters 330a-330d also select the light of the corresponding wavelength from propagation light being propagated through the optical waveguide 310, which exits from a vertical side face of the respective groove 325, enters the respective optical pin 340, and is reflected to a PD, which is the light receiving element of the corresponding VCSEL/PD chips 335a-335d.

In this example, optical signals multiplexed by the wavelengths of 940 nm, 980 nm, 1020 nm, and 1060 nm are inputted. DBR filter 330d reflects the light of the corresponding 1060 nm wavelength from the propagation light that is propagated through optical waveguide 310 from a right side, exits from the vertical side face of the respective groove 325 and enters the respective optical pin 340, and allows the light of the remaining 940 nm, 980 nm, and 1020 nm wavelengths to pass through. DBR filter 330c reflects the light of the corresponding 1020 nm wavelength from the propagation light that is propagated through the optical waveguide 310 from the right side, exits from the vertical side face of the respective groove 325 and enters the respective optical pin 340, and allows the light of the remaining 940 nm and 980 nm wavelengths to pass through. DBR filter 330b reflects the light of the corresponding 980 nm wavelength from the propagation light that is propagated through the optical waveguide 310 from the right side, exits from the vertical side face of the respective groove 325 and enters the respective optical pin 340, and allows the light of the remaining 940 nm wavelength to pass through. DBR filter 330a reflects the light of the corresponding 940 nm wavelength from the propagation light that is propagated through the optical waveguide 310 from the right side, exits from the vertical side face of the respective groove 325 and enters the respective optical pin 340.

Similarly, in this example, optical signals multiplexed by the wavelengths of 940 nm, 980 nm, 1020 nm, and 1060 nm are outputted. DBR filter 330a reflects the light of the corresponding 940 nm wavelength that exits from VCSEL/PD chip 335a and enters the respective optical pin 340, and makes the light of the 940 nm wavelength enter the optical waveguide 310. DBR filter 330b allows the light of the 940 nm wavelength propagated through the optical waveguide 310 from a left side to pass through, reflects the light of the corresponding 980 nm wavelength that exits from VCSEL/PD chip 335b and enters the respective optical pin 340, and makes the light of the 940 nm and 980 nm wavelengths enter the optical waveguide 310. DBR filter 330c allows the light of the 940 nm and 980 nm wavelengths propagated through the optical waveguide 310 from the left side to pass through, reflects the light of the corresponding 1020 nm wavelength that exits from VCSEL/PD chip 335c and enters the respective optical pin 340, and makes the light of the 940 nm, 980 nm, and 1020 nm wavelengths enter the optical waveguide 310. DBR filter 330d allows the light of the 940 nm, 980 nm, and 1020 nm wavelengths propagated through the optical waveguide 310 from the left side to pass through, reflects the light of the corresponding 1060 nm wavelength that exits from VCSEL/PD chip 335d and enters the respective optical pin 340, and makes the light of the 940 nm, 980 nm, 1020 nm, and 1060 nm wavelengths enter the optical waveguide 310.

VCSEL/PD chips 335a-335d are each provided with wiring 350 for electrical connection, but wiring 350 does not pass through optical waveguide 310. Since the propagation light propagated through optical waveguide 310 exits through the vertical side face of the respective grooves 325, the reflection of the propagation light there is small, loss due to the reflection can be suppressed, and it is not necessary to further use an optical filter such as a non-reflection film. The respective grooves 325 and DBR filters 330a-330d are covered with light transmissive underfill 345. When the propagation light exiting through the vertical side face of the respective grooves 325 is made to enter inside underfill 345 rather than the air, divergence of the light is suppressed and the loss can be further reduced.

Figure 4A:
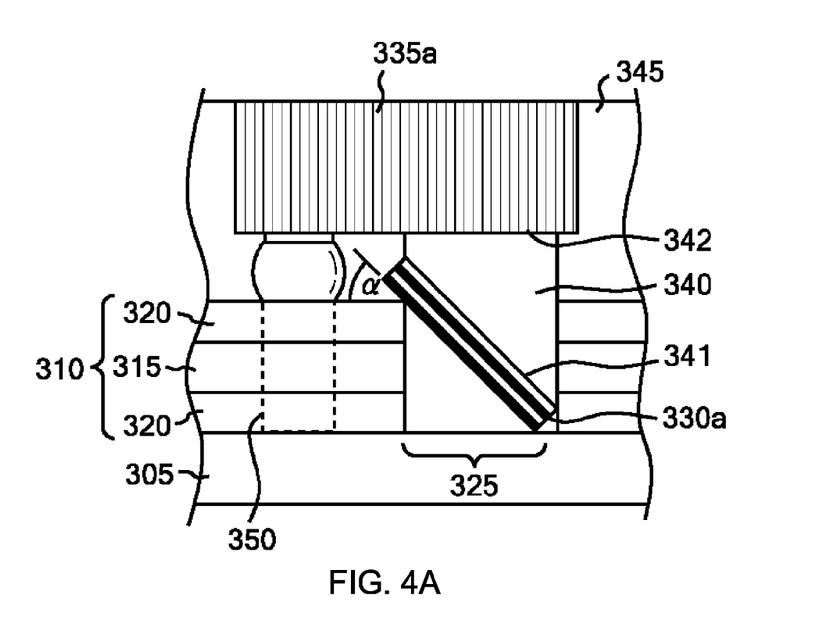
FIG. 4A is a sectional side view magnifying and illustrating a portion of the structure shown in FIG. 3.

FIG. 4A illustrates a sectional side view in which a portion of the optical module 300 of FIG. 3 is magnified. The groove 325 has a side face vertical to the surface of the substrate 305. For the optical pin 340, a bottom surface 342 at the lower end is provided in contact with the light emitting surface and light receiving surface of the VCSEL/PD chip 335a (940 nm). An inclination angle α of an inclined surface 341 at the upper end of the optical pin 340 is preferably 45 degrees to the surface of the substrate 305.

Figure 4B:
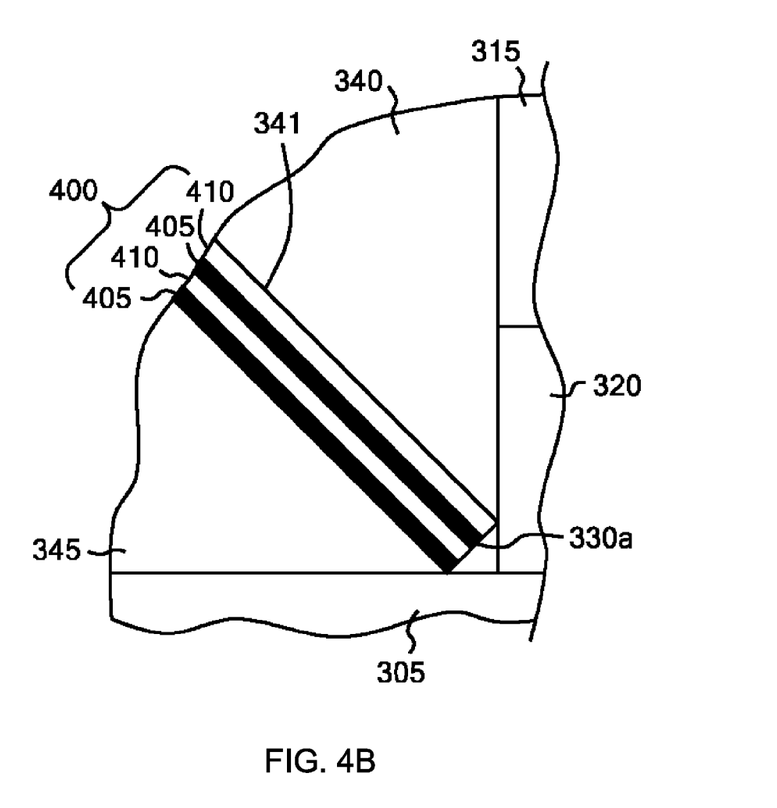
FIG. 4B is a sectional side view magnifying and illustrating a portion of the structure shown in FIG. 4A.

FIG. 4B illustrates a sectional side view in which a portion of the structure shown in FIG. 4A, including the DBR filter 330a, is magnified. As illustrated in FIG. 4B, DBR filter 330a is formed of a multilayer film 400 for which a dielectric 405 whose refractive index is n1 and a dielectric 410 whose refractive index is n2 are alternately piled up, for instance. By interference of multi-reflection light at an interface of the dielectric 405 and the dielectric 410, reflectance is made wavelength-dependent. By varying a thickness of each layer of the dielectric 405 and the dielectric 410, the wavelength dependency of the reflectance can be varied for each of DBR filters 330a-330d. For instance, when the thickness of the layer is increased, a longer wavelength is reflected.

Figure 5A:
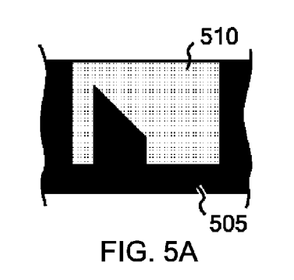
FIGS. 5A-H are diagrams schematically illustrating formation of optical pins and light selecting filters on a chip side including light emitting and light receiving pairs in an optical module manufacturing method, according to one embodiment of the present invention.
Figure 5B:
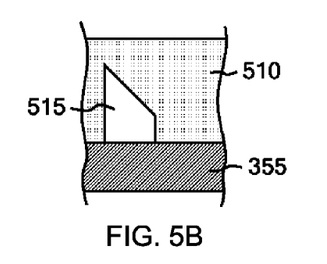
Figure 5C:
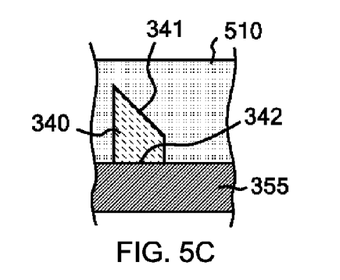
Figure 5D:
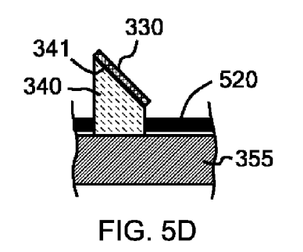

FIGS. 5A-H schematically illustrate formation of optical pins and light selecting filters on a chip side including light emitting element and light receiving element pairs in an optical module manufacturing method, according to one embodiment of the present invention. In FIG. 5A, a replica resin die 510 is produced from an original mold 505 of silicon or quartz, for instance, wherein patterns of the plurality of optical pins are formed, each having an inclined surface (inclined at 45 degrees to a horizontal plane, for instance) on the upper end. In FIG. 5B, the replica resin die 510 is positioned and placed on a wafer 355 provided with the plurality of light emitting and light receiving element pairs (VCSEL/PD chips, for instance) respectively corresponding to the plurality of different wavelengths of light. At the replica resin die 510, a die 515 for the plurality of optical pins 340 is formed. In FIG. 5C, the plurality of optical pins 340 are formed on the wafer 355 by applying a release agent to the side of the replica resin die 510, putting a curable light transmissive resin (a photocurable acrylic resin, for instance) into the replica resin die 510, and detaching the replica resin die 510 after curing the curable light transmissive resin. For optical pins 340 that are formed, the lower end has the bottom surface 342 in contact with the light emitting surface and light receiving surface of the light emitting and light receiving element pair (a VCSEL/PD chip, for instance) in the wafer 355, and the upper end has the inclined surface 341.

Figure 5E:
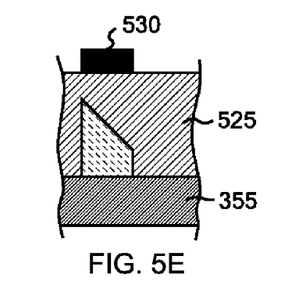
Figure 5F:
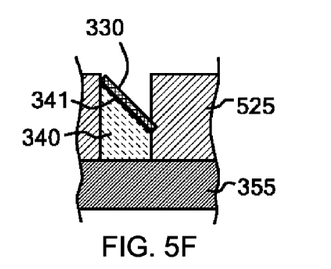
Figure 5G:
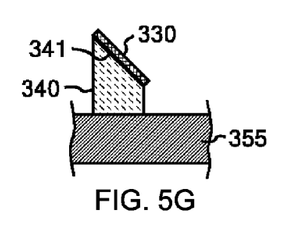

In FIG. 5D or FIGS. 5E-G, the plurality of light selecting filters 330 (for instance, DBR filters constituted of silicon dioxide SiO2 and magnesium fluoride MgF2) which reflect the light of the respectively corresponding wavelengths are formed on the inclined surfaces 341 of the plurality of optical pins 340 formed on the wafer 355. Particularly, in FIG. 5D, the plurality of light selecting filters 330 are formed by forming a mask 520 for exposing the inclined surfaces 341 of the plurality of optical pins 340 on the wafer 355 where the plurality of optical pins 340 are formed, and vapor-depositing light selecting filters 330 (DBR filters, for instance) onto the exposed inclined surfaces 341 of the plurality of optical pins 340. In FIGS. 5E-G, resist 525 is attached onto the wafer 355 where the plurality of optical pins 340 are formed and the mask 530 is formed in FIG. 5E, the resist 525 is exposed and developed using the mask 530, the inclined surfaces 341 of the plurality of optical pins 340 are exposed from the resist 525, the light selecting filters 330 (DBR filters, for instance) are vapor-deposited to the exposed inclined surfaces 341 of the plurality of optical pins 340 in FIG. 5F, and the resist 525 is removed from the wafer 355 in FIG. 5G, thereby forming the plurality of light selecting filters 330 for reflecting the light of the respectively corresponding wavelengths on the inclined surfaces 341 of the plurality of optical pins 340 formed on the wafer 355.

Figure 5H:
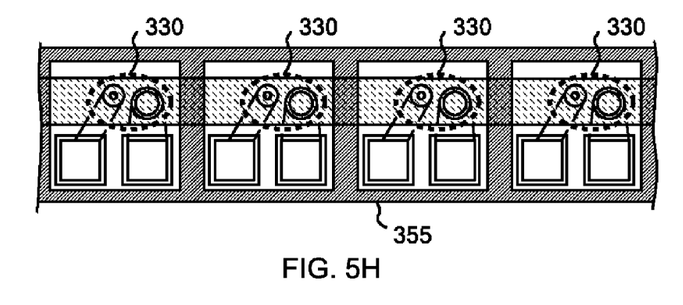

FIG. 5H is a top plan view, in which the wafer 355 is diced to cut out a plurality of chips each having an optical pin 340 where a light selecting filter 330 is formed, and a light emitting and light receiving element pair. As illustrated in FIG. 5H, when the plurality of light emitting and light receiving element pairs correspond to VCSEL/PD chips 335a-d, for instance, and are arranged and formed side-by-side at a pitch interval of the optical waveguides 310, the cut-out chips are lined side-by-side and can be used for the plurality of optical waveguides 310 as they are, without further individually cutting off the plurality of light emitting and light receiving element pairs.

Figure 6A:
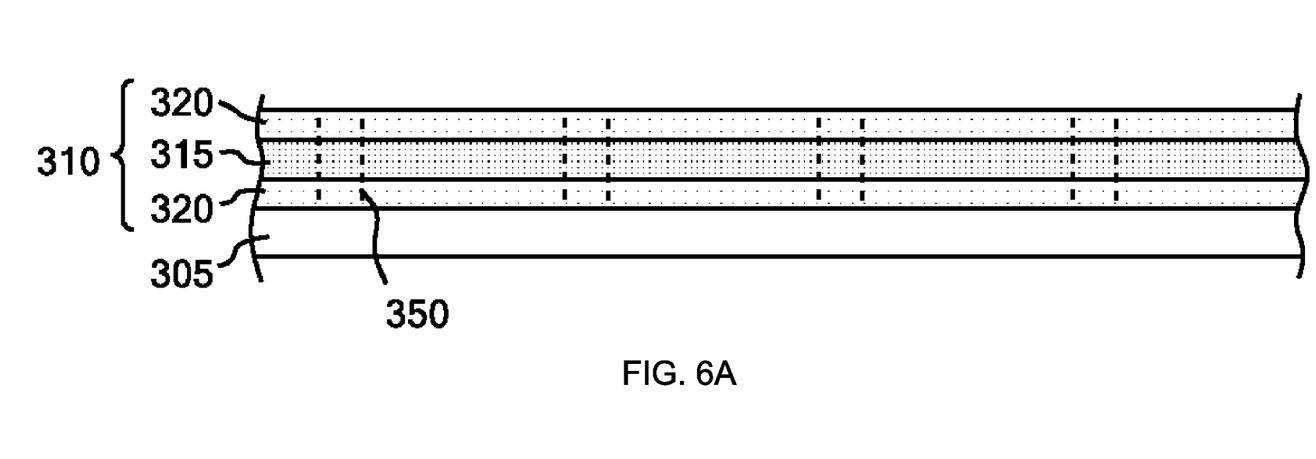
FIGS. 6A and 6B are diagrams schematically illustrating formation of grooves on a substrate side including an optical waveguide in an optical module manufacturing method, according to one embodiment of the present invention.
Figure 6B:
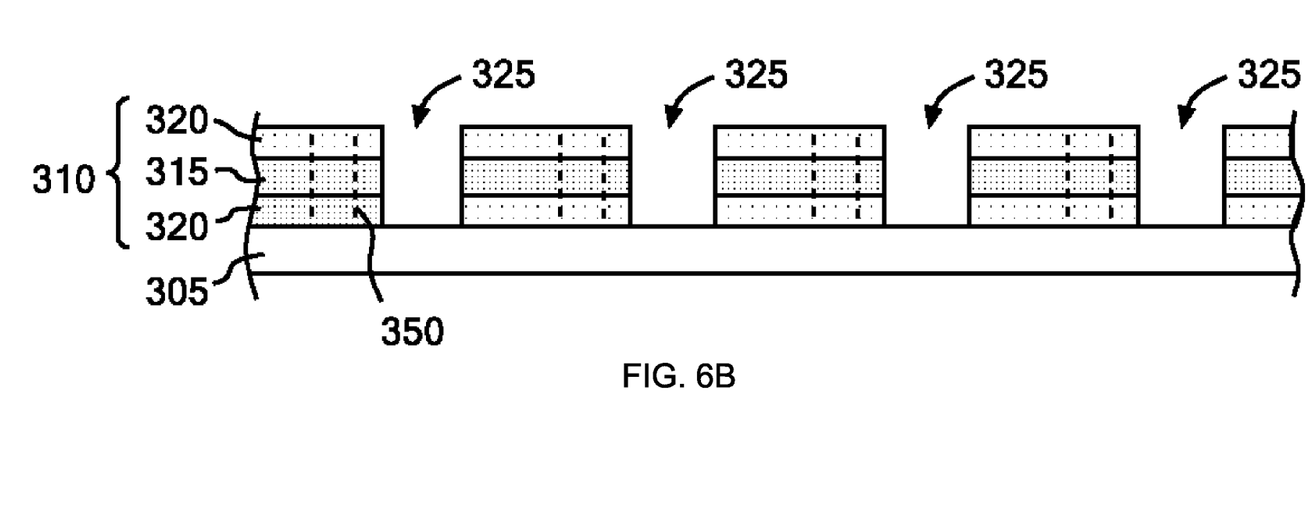

FIGS. 6A and 6B schematically illustrate formation of grooves on a substrate side including the optical waveguide in an optical module manufacturing method, according to one embodiment of the present invention. In FIG. 6A, the substrate 305 is prepared for which the plurality of optical waveguides 310 are disposed at an appropriate interval on the surface, and the wiring 350 is formed for the plurality of light emitting and light receiving element pairs (VCSEL/PD, for instance) provided on the individual optical waveguides 310. In FIG. 6B, the plurality of grooves 325 are formed on the optical waveguides 310 provided on the surface of the substrate 305 at a prescribed position from the wiring 350. The grooves 325 can be in any shape as long as the optical pins 340 can be put in, and high accuracy is not necessary for forming the grooves 325.

Figure 7:
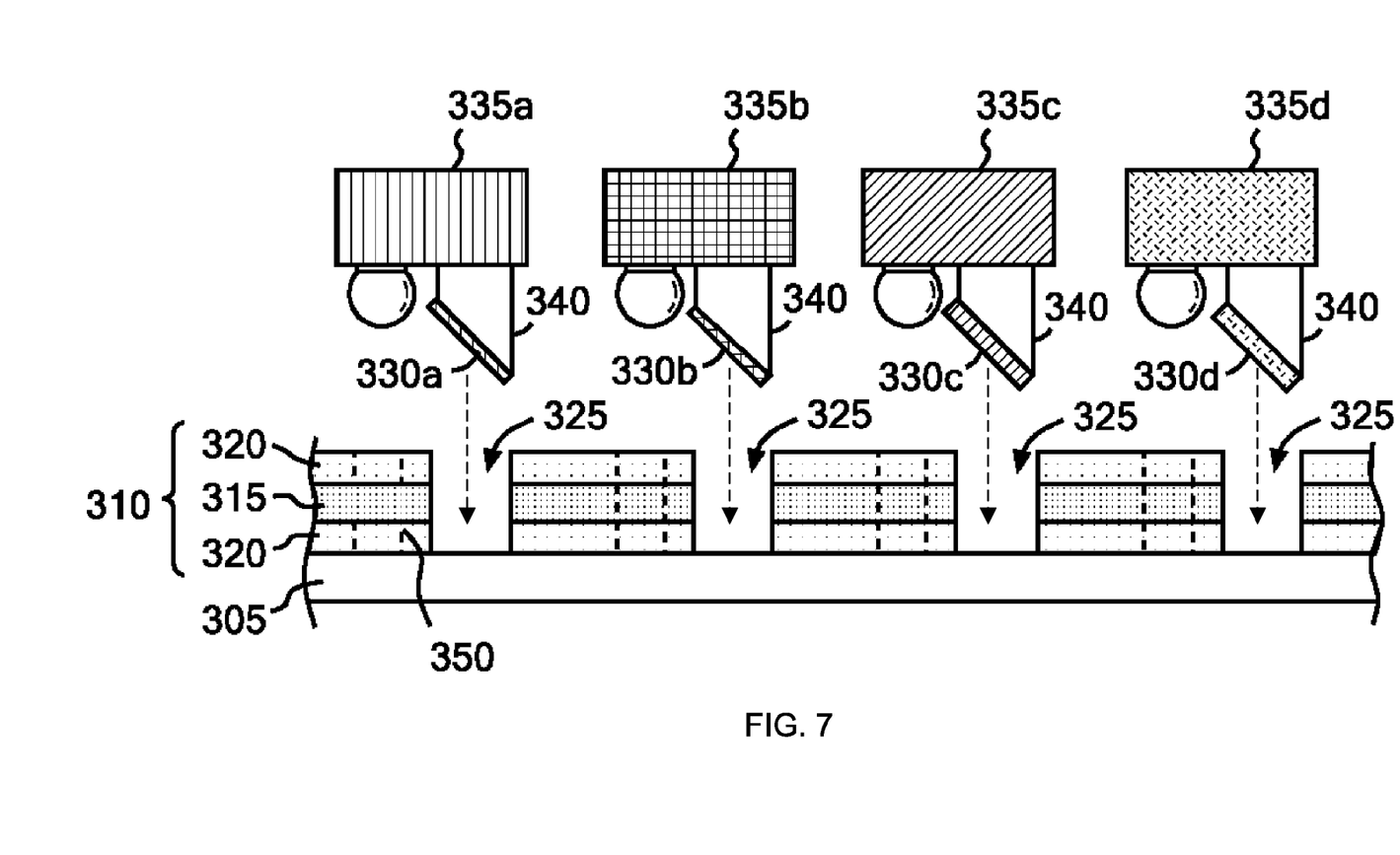
FIG. 7 is a diagram schematically illustrating a process of assembling a chip including a light emitting and light receiving element pair to a substrate including an optical waveguide, according to one embodiment of the present invention.

FIG. 7 schematically illustrates a process of assembling a chip including a light emitting and light receiving element pair to a substrate including an optical waveguide, according to one embodiment of the present invention. The plurality of VCSEL/PD chips 335*a*-335*d* are cut out in FIG. 5H. Each chip includes the optical pin 340 where the respectively corresponding light selecting filters 330*a*-330*d* are formed, and a solder bump, for instance, to be connected to the wiring 350 of the substrate 305. The plurality of optical pins 340 where the respectively corresponding light selecting filters 330*a*-330*d* are formed are disposed in the plurality of grooves 325 formed on the optical waveguide 310, and the plurality of VCSEL/PD chips 335*a*-335*d* are provided on the surface of the substrate 305. The light selecting filters 330*a*-330*d* are already formed on the inclined surfaces 341 of the optical pins 340 provided on the VCSEL/PD chips 335*a*-335*d*. Thus, just by inserting and disposing the plurality of optical pins 340 into the plurality of grooves 325 formed on the optical waveguide 310 and assembling the VCSEL/PD chips 335*a*-335*d* to the substrate 305 (i.e., just by executing flip-chip mounting), the optical waveguide 310 can be provided with the light selecting filters 330*a*-330*d*. Also, when forming the light selecting filters 330*a*-330*d* on the inclined surfaces 341 of the optical pins 340 provided on the VCSEL/PD chips 335*a*-335*d*, the individual light selecting filters of the corresponding wavelengths can be formed at once individually. Therefore, since it is not needed to change the thickness of individual films of the dielectric and form the plurality of light selecting filters corresponding to the respectively different wavelengths together, the light selecting filters can be easily and efficiently formed and a manufacturing cost can be lowered. Further, since the optical waveguide 310 and the grooves 325 are formed on the side of the substrate 305, and the optical pins 340 and the light selecting filters 330*a*-330*d* are formed in addition to the VCSEL/PD on the side of the VCSEL/PD chips 335*a*-335*d*, one can select only non-defective VCSEL/PD chips 335*a*-335*d* to be mounted on the substrate 305, which can raise yields in manufacturing of the optical modules.

Figure 8:
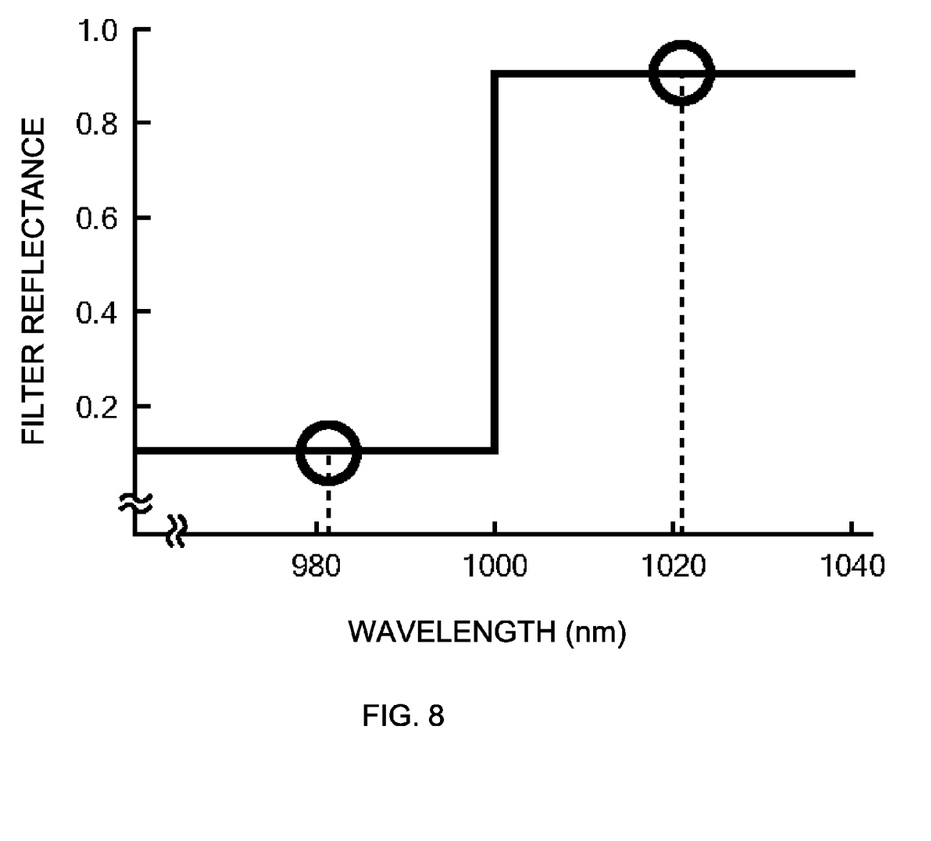
FIG. 8 is a graph illustrating one example of reflectance to wavelengths of a DBR filter used in the optical module, according to one embodiment of the present invention.

FIG. 8 illustrates a graph of one example of reflectance to wavelengths for DBR filters 330*a*-330*d* used in the optical module 300. As a characteristic of the DBR filters 330*a*-330*d*, the filter in which the reflectance is high near a specific wavelength and the reflectance is low in the other wavelength region is illustrated as an example; however, since the filter of the high reflectance to the specific wavelength is structured such that the light of the wavelength longer than the specific wavelength does not pass through, the filter characteristic may be such that, as illustrated in FIG. 8, there is a step between the wavelengths shorter and longer than the specific wavelength to be used as a boundary (1000 nm, for instance), and the reflectance is high on a long wavelength side of the boundary and the reflectance is low on a short wavelength side of the boundary. When the arrangement of the VCSEL/PD chips 335*a*-335*d* is opposite to the illustrated example, the filter characteristic needs to be opposite to the above, that is, the reflectance needs to be low on the long wavelength side of the boundary and the reflectance needs to be high on the short wavelength side of the boundary.

Figure 9A:
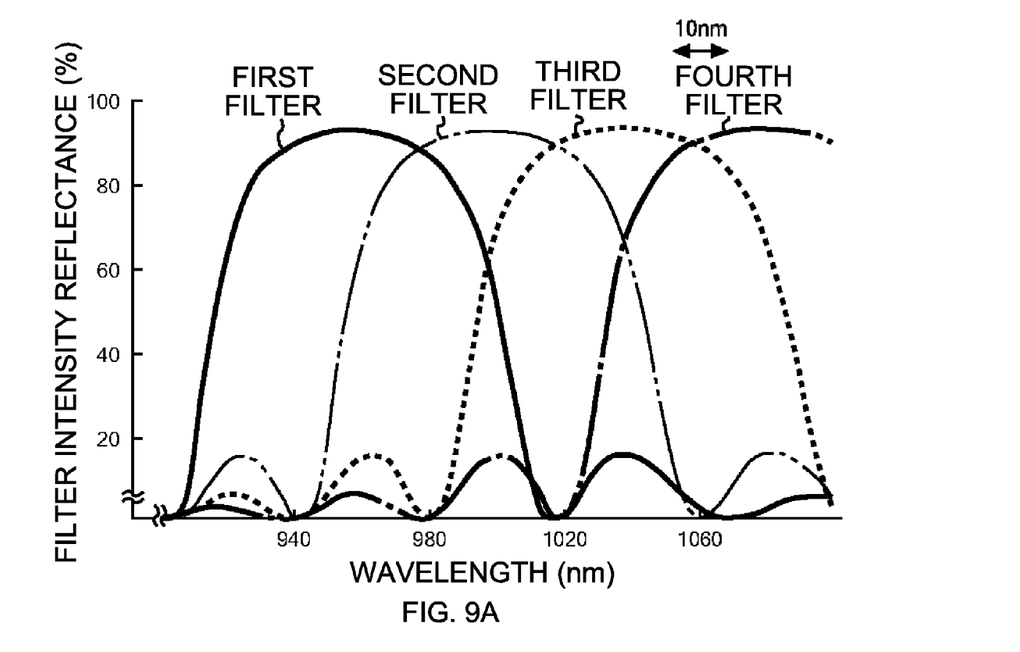
FIGS. 9A and 9B are a graph and a table, respectively, illustrating one example of loss due to reflection and transmission of a DBR filter used in an optical module, according to one embodiment of the present invention.
Figure 9B:
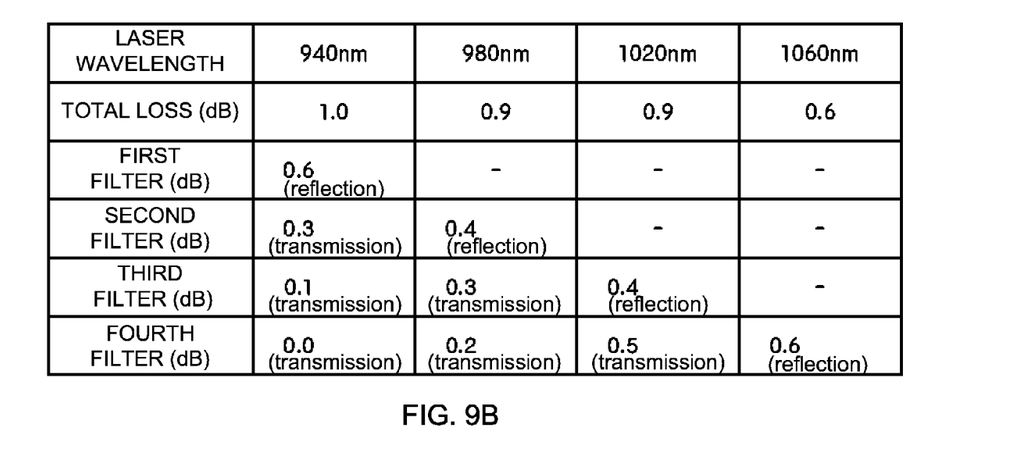

FIGS. 9A and 9B are a graph and a table, respectively, illustrating one example of loss due to reflection and transmission of the DBR filters 330*a*-330*d* used in the optical module 300, according to one embodiment of the present invention. The example illustrates a case in which the light is S polarized light. A first filter is the DBR filter 330*a* (940 nm), a second filter is the DBR filter 330*b* (980 m), a third filter is the DBR filter 330*c* (1020 nm), and a fourth filter is the DBR filter 330*d* (1060 nm). A configuration of each of the DBR filters 330*a*-*d* is a multilayer film structure with 20 dielectric pairs. The dielectric pairs are constituted of a dielectric whose refractive index is 1.38 (like MgF2 (magnesium fluoride) for instance) and that is turned to the thickness of 0.2608 times the wavelength of the light, and a dielectric whose refractive index is 1.45 (like SiO2 (silicon dioxide) for instance) and that is turned to the thickness of 0.2482 times the wavelength of the light.

As illustrated in the graph of FIG. 9A, the first filter has high reflectance at the wavelengths of 940 nm to 980 nm and reflects the light having a wavelength of 980 nm as well; however, since the light having a wavelength of 980 nm is reflected by the second filter and does not reach the first filter, there is no operational problem. Also, the second filter has the high reflectance at the wavelengths of 980 nm to 1020 nm and reflects the light having a wavelength of 1020 nm as well; however, since the light having a wavelength of 1020 nm is reflected by the third filter and does not reach the second filter, there is no operational problem. Also, the third filter has the high reflectance at the wavelengths of 1020 nm to 1060 nm and reflects the light having a wavelength of 1060 nm as well; however, since the light having a wavelength of 1060 nm is reflected by the fourth filter and does not reach the third filter, there is no operational problem.

As illustrated in the table of FIG. 9B, for the light having a wavelength of 940 nm, the loss in the first filter is 0.6 dB due to the reflection, the loss in the second filter is 0.3 dB due to the transmission, the loss in the third filter is 0.1 dB due to the transmission, the loss in the fourth filter is 0.0 dB without the loss due to the transmission, and the total loss is 1.0 dB. For the light having a wavelength of 980 nm, there is no loss in the first filter since the light does not reach the first filter, the loss in the second filter is 0.4 dB due to the reflection, the loss in the third filter is 0.3 dB due to the transmission, the loss in the fourth filter is 0.2 dB due to the transmission, and the total loss is 0.9 dB. For the light having a wavelength of 1020 nm, there is no loss in the first and second filters since the light does not reach the first and second filters, the loss in the third filter is 0.4 dB due to the reflection, the loss in the fourth filter is 0.5 dB due to the transmission, and the total loss is 0.9 dB. For the light having a wavelength of 1060 nm, there is no loss in the first, second and third filters since the light does not reach the first, second and third filters, the loss in the fourth filter is 0.6 dB due to the reflection, and the total loss is 0.6 dB. When the light is S polarized light, in multiplexing of the four wavelengths, connection loss of 1 dB or less is achieved.

Figure 10A:
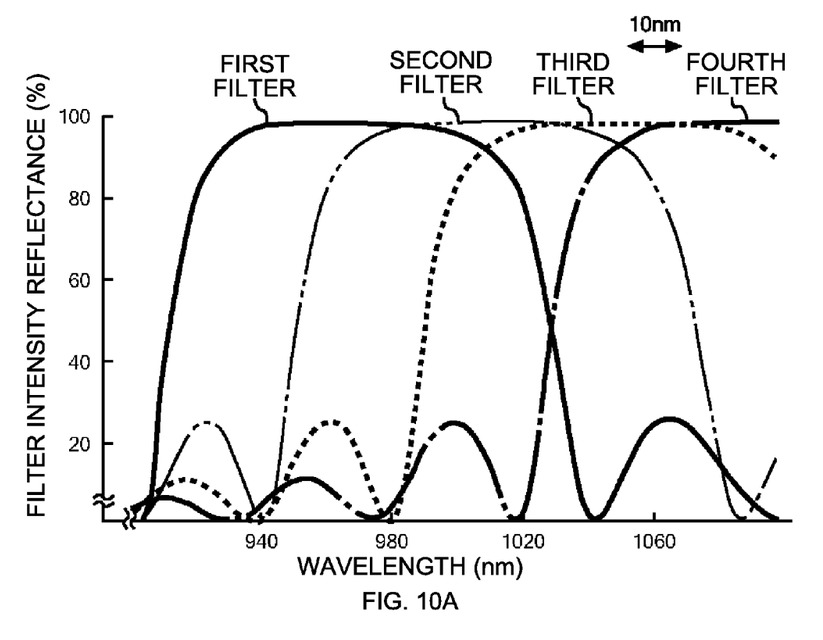
FIGS. 10A and 10B are a graph and a table, respectively, illustrating another example of loss due to reflection and transmission of a DBR filter used in an optical module, according to one embodiment of the present invention.
Figure 10B:
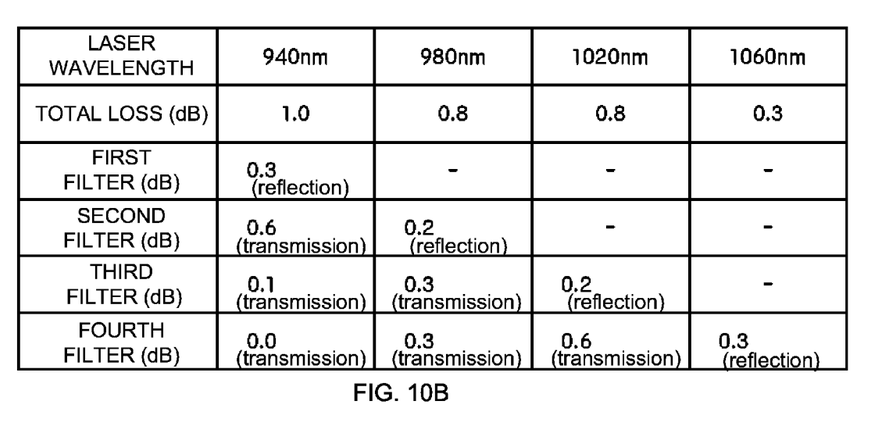

FIGS. 10A and 10B are a graph and a table, respectively, illustrating another example of loss due to reflection and transmission of the DBR filters 330*a*-330*d* used in the optical module 300, according to one embodiment of the present invention. This example illustrates a case in which the light is P polarized light. The first is the DBR filter 330a (940 nm), the second filter is the DBR filter 330b (980 m), the third filter is the DBR filter 330c (1020 nm), and the fourth filter is the DBR filter 330d (1060 nm). The configuration of each of the DBR filters 330a-d DBR is a multilayer film structure with 18 dielectric pairs. The dielectric pairs are constituted of a dielectric whose refractive index is 1.38 (like MgF2 (magnesium fluoride) for instance) and that is turned to the thickness of 0.2641 times the wavelength of the light, and a dielectric whose refractive index is 1.74 (like MgO (magnesium oxide) for instance) and that is turned to the thickness of 0.2095 times the wavelength of the light.

As illustrated in the graph of FIG. 10A, the first filter has the high reflectance at the wavelengths of 940 nm to 1020 nm and reflects the light having a wavelength of 980 nm and 1020 nm as well; however, since the light having a wavelength of 980 nm and 1020 nm is reflected by the second and third filters respectively and does not reach the first filter, there is no operational problem. Also, the second filter has the high reflectance at the wavelengths of 980 nm to 1060 nm and reflects the light having a wavelength of 1020 nm and 1060 nm as well; however, since the light having a wavelength of 1020 nm and 1060 nm is reflected by the third and fourth filters respectively and does not reach the second filter, there is no operational problem. Also, the third filter has the high reflectance at the wavelengths of 1020 nm to 1080 nm and reflects the light having a wavelength of 1060 nm as well; however, since the light having a wavelength of 1060 nm is reflected by the fourth filter and does not reach the third filter, there is no operational problem.

As illustrated in the table of FIG. 10B, for the light having a wavelength of 940 nm, the loss in the first filter is 0.3 dB due to the reflection, the loss in the second filter is 0.6 dB due to the transmission, the loss in the third filter is 0.1 dB due to the transmission, the loss in the fourth filter is 0.0 dB without the loss due to the transmission, and the total loss is 1.0 dB. For the light having a wavelength of 980 nm, there is no loss in the first filter since the light does not reach the first filter, the loss in the second filter is 0.2 dB due to the reflection, the loss in the third filter is 0.3 dB due to the transmission, the loss in the fourth filter is 0.3 dB due to the transmission, and the total loss is 0.8 dB. For the light having a wavelength of 1020 nm, there is no loss in the first and second filters since the light does not reach the first and second filters, the loss in the third filter is 0.2 dB due to the reflection, the loss in the fourth filter is 0.6 dB due to the transmission, and the total loss is 0.8 dB. For the light having a wavelength of 1060 nm, there is no loss in the first, second, and third filters since the light does not reach the first, second and third filters, the loss in the fourth filter is 0.3 dB due to the reflection, and the total loss is 0.3 dB. When the light is P polarized light, in the multiplexing of the four wavelengths, the connection loss of 1 dB or less is achieved.

The descriptions of the various embodiments of the present invention have been presented for purposes of illustration, but are not intended to be exhaustive or limited to the embodiments disclosed. Many modifications and variations apparent to those of ordinary skill in the art can be made without departing from the scope and spirit of the described embodiments.

What is claimed is:

1. An optical module comprising:
   at least one optical waveguide provided on a surface of a substrate;
   a plurality of grooves provided on the at least one optical waveguide on the surface of the substrate;
   a plurality of light emitting and light receiving element pairs positioned on the plurality of grooves of the at least one optical waveguide, wherein each light emitting and light receiving element pair respectively corresponds to a different wavelength of light of a plurality of wavelengths of light;
   a plurality of optical pins provided in each of the plurality of light emitting and light receiving element pairs and disposed in the plurality of grooves of the at least one optical waveguide, each of the plurality of optical pins being configured to allow light exiting from a light emitting element and light entering a light receiving element to pass through, each of the plurality of optical pins being provided with an inclined surface on an upper end on a side opposite to a lower end, wherein the inclined surface is inclined to turn, when light from an optical waveguide is reflected on the inclined surface, the reflected light to a light receiving element, and to turn, when light from a light emitting element is reflected, the reflected light to an optical waveguide; and
   a light selecting filter provided on each of the inclined surfaces of the plurality of optical pins, wherein each light selecting filter is configured to reflect light of a corresponding wavelength exiting from the light emitting element of the corresponding light emitting and light receiving element pair, select light of the corresponding wavelength from propagation light propagated through the at least one optical waveguide, and reflect light to the light receiving element of the corresponding light emitting and light receiving element pair, respectively.

2. The optical module according to claim 1, wherein the different wavelengths of light of the plurality of wavelengths of light differ by at least 10 nm.

3. The optical module according to claim 1, wherein each of the inclined surfaces of the plurality of optical pins is a surface inclined at 45 degrees to the surface of the substrate.

4. The optical module according to claim 1, wherein the plurality of optical pins are formed of a light transmissive resin.

5. The optical module according to claim 1, wherein each of the light selecting filters is a DBR (Distributed Bragg Reflector) filter.

6. The optical module according to claim 1, wherein light transmissive underfill is filled in the plurality of grooves of the at least one optical waveguide.

7. A manufacturing method of an optical module comprising:
   producing a replica resin die from an original mold, wherein patterns of a plurality of optical pins each having an inclined surface on an upper end are formed;
   positioning the replica resin die on a wafer provided with a plurality of light emitting and light receiving element pairs respectively corresponding to a different wavelength of light of a plurality of wavelengths of light;
   forming the plurality of optical pins on the wafer by applying a release agent to the replica resin die, putting a curable light transmissive resin into the replica resin die, and detaching the replica resin die after curing the curable light transmissive resin;
   forming a plurality of light selecting filters for reflecting light of respectively corresponding wavelengths on the inclined surfaces of the plurality of optical pins formed on the wafer;
   dicing the wafer to cut out a plurality of chips, each chip having an optical pin where a light selecting filter is formed and a light emitting and light receiving element pair;

forming a plurality of grooves on at least one optical waveguide provided on a surface of a substrate; and disposing the plurality of optical pins where the respectively corresponding light selecting filters are formed in the plurality of grooves formed on the at least one optical waveguide.

8. The method according to claim 7, wherein each of the inclined surfaces of the plurality of optical pins is a surface inclined at 45 degrees to the surface of the substrate.

9. The method according to claim 7, wherein the curable light transmissive resin is a photocurable acrylic resin.

10. The method according to claim 7, wherein forming the plurality of light selecting filters for reflecting light of respectively corresponding wavelengths on the inclined surfaces of the plurality of optical pins formed on the wafer comprises:

forming a mask for exposing the inclined surfaces of the plurality of optical pins where the plurality of optical pins are formed on the wafer; and vapor-depositing a DBR (Distributed Bragg Reflector) filter onto the exposed inclined surfaces of the plurality of optical pins.

11. The method according to claim 10, wherein forming a mask for exposing the inclined surfaces of the plurality of optical pins where the plurality of optical pins are formed on the wafer comprises:

attaching resist onto the wafer where the plurality of optical pins are formed;

exposing and developing the resist using the mask; and exposing the inclined surfaces of the plurality of optical pins from the resist.

12. The method according to claim 7, further comprising:

providing, on the surface of the substrate, the plurality of chips.

* * * * *